United States Patent
Uthe

(10) Patent No.: US 9,158,749 B2
(45) Date of Patent: Oct. 13, 2015

(54) SMART FORM COMPLETION OF FORM VALUES

(75) Inventor: Robert T. Uthe, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 2008 days.

(21) Appl. No.: 11/233,885

(22) Filed: Sep. 23, 2005

(65) Prior Publication Data

US 2007/0074101 A1     Mar. 29, 2007

(51) Int. Cl.
| | |
|---|---|
| *G06F 17/00* | (2006.01) |
| *G06F 17/24* | (2006.01) |
| *G06F 17/22* | (2006.01) |
| *G06F 17/21* | (2006.01) |

(52) U.S. Cl.
CPC ............ *G06F 17/243* (2013.01); *G06F 17/212* (2013.01); *G06F 17/2247* (2013.01); *G06F 17/24* (2013.01)

(58) Field of Classification Search
CPC ... G06F 17/2247; G06F 17/24; G06F 17/243; G06F 17/212
USPC .............. 715/221–226, 212, 246, 271; 707/1, 707/104.1, 100, 102
See application file for complete search history.

(56) References Cited

U.S. PATENT DOCUMENTS

| | | | |
|---|---|---|---|
| 5,235,654 A | | 8/1993 | Anderson et al. |
| 5,555,101 A | | 9/1996 | Larson et al. |
| 6,088,700 A | * | 7/2000 | Larsen et al. ................... 707/10 |
| 6,301,591 B2 | * | 10/2001 | Katsumata et al. ........... 715/222 |
| 6,327,598 B1 | * | 12/2001 | Kelley et al. .................. 715/205 |
| 6,360,250 B1 | * | 3/2002 | Anupam et al. ............... 709/204 |
| 6,589,290 B1 | | 7/2003 | Maxwell et al. |
| 6,651,217 B1 | * | 11/2003 | Kennedy et al. .............. 715/224 |
| 7,203,699 B2 | * | 4/2007 | Bellamy ....................... 707/102 |
| 7,206,998 B2 | * | 4/2007 | Pennell et al. ................ 715/224 |
| 7,222,296 B2 | * | 5/2007 | Breymeier et al. ........... 715/221 |
| 2002/0013788 A1 | * | 1/2002 | Pennell et al. ................ 707/507 |
| 2002/0023108 A1 | * | 2/2002 | Daswani et al. .............. 707/507 |
| 2002/0198903 A1 | * | 12/2002 | Robison et al. ............... 707/500 |
| 2004/0205526 A1 | * | 10/2004 | Borodovski et al. .......... 715/505 |
| 2005/0125715 A1 | * | 6/2005 | Di Franco et al. ............ 715/505 |
| 2005/0183002 A1 | * | 8/2005 | Chapus ......................... 715/505 |
| 2006/0031761 A1 | * | 2/2006 | Ohta ............................. 715/517 |

OTHER PUBLICATIONS

Raggett, Dave, HTML 4.01 Specification, W3C Recommendation Dec. 24, 1999 http://www.w3.org/TR/1999/REC-html401-19991224.*

* cited by examiner

*Primary Examiner* — Adam M Queler
(74) *Attorney, Agent, or Firm* — Steven M. Greenberg, Esq.; CRGO Law

(57) ABSTRACT

Embodiments of the present invention address deficiencies of the art in respect to form value processing and provide a method, system and computer program product for smart completion of form values in a form. In a first embodiment of the invention, a data processing system for completing form data can include smart complete logic configured for coupling to a content server in a content distribution platform. The smart complete logic can include program code enabled to dispose a smart complete control element and a save control element in a form where the smart complete control element can include one or more selectable form value sets.

9 Claims, 3 Drawing Sheets

SMART FORM COMPLETION OF FORM VALUES

BACKGROUND OF THE INVENTION

1. Field of the Invention

The present invention relates to the field of form-based input and more particularly to the rapid completion of fields in a form.

2. Description of the Related Art

Form based input is the enabling technology which permits the widespread distribution of applications across generic client platforms such as the conventional content browser. In the modern context of Web based forms, a markup language defined interface can form the principal conduit through which end users can interact with backend application logic. Often configured in the form of a Web page, the interface can be provided to the content browser by a content server and can take the form either of a pre-defined static page, or a dynamically generated page. Form input fields can be positioned within the interface through which user input can be accepted and posted to the backend application logic for further processing.

Completing a form can be of no consequence to the end user where only a few fields are to be completed. Even where the form is so complex as to include a multiplicity of fields across multiple pages like a tabbed notebook or wizard style form, completing the form can be of no consequence where the form is only to be completed occasionally. By comparison, where the fields of a form are to be completed repeatedly on many occasions, regardless of the number of fields in the form, the process can become tedious and inefficient.

To account for these inefficiencies, technologies have been developed to persist common field entries for forms. In this regard, Web browsers often include an auto-completion feature in which a user is presented with the set of values previously entered for a given field that has focus, such as last name, first name, and address. Other technologies including the wholesale copying of existing form values into a duplicate set of form values from which modifications can be made to produce a new set of form values. Yet other technologies permit an end user to save the current state of a form so that the end user can complete the form at a later time. None, however, permit the reuse of field values when completing a new instance of a form.

BRIEF SUMMARY OF THE INVENTION

Embodiments of the present invention address deficiencies of the art in respect to form value processing and provide a novel and non-obvious method, system and computer program product for smart completion of form values in a form. In a first embodiment of the invention, a data processing system for completing form data can include smart complete logic configured for coupling to a content server in a content distribution platform. The smart complete logic can include program code enabled to expose a smart complete control element and a save control element in a form where the smart complete control element can include one or more selectable form value sets.

The smart complete control element further can include a configuration to invoke logic enabled to retrieve a selected one of the form value sets and to apply field values in the selected one of the form value sets to corresponding fields in the form. The smart complete control element further can include a configuration to invoke logic enabled to retrieve for use in a form instance for a first user, a selected one of the form value sets produced by a second user and to apply field values in the selected one of the form value sets to corresponding fields in the form. The save control element, by comparison, can include a configuration to invoke logic enabled to save a set of values for fields in the form to a form value set and to identify whether the value set should be available for any other users.

In a second embodiment of the invention, a computer implemented method for completing form fields defined in a form can include presenting a list of form value sets for the form, selecting a form value set from amongst the form value sets in the list, and applying form field values in the selected form value set to corresponding fields in the form. The method further can include providing at least one value for a field in the form, and saving each value for each field in the form in a new form value set. The method yet further can include sharing the new form value set with another user. Finally, the method can include submitting the form over a data communications network.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for smart completion of form values in a form. In accordance with an embodiment of the present invention, form values for an instance of a form can be saved as a form set. Subsequently, the form values can be retrieved in a different instance of the form and applied to the fields of the different instance of the form. Once the values have been applied to the fields of the different instance of the form, the values can be modified or the values can be submitted without modification.

Figure 1:
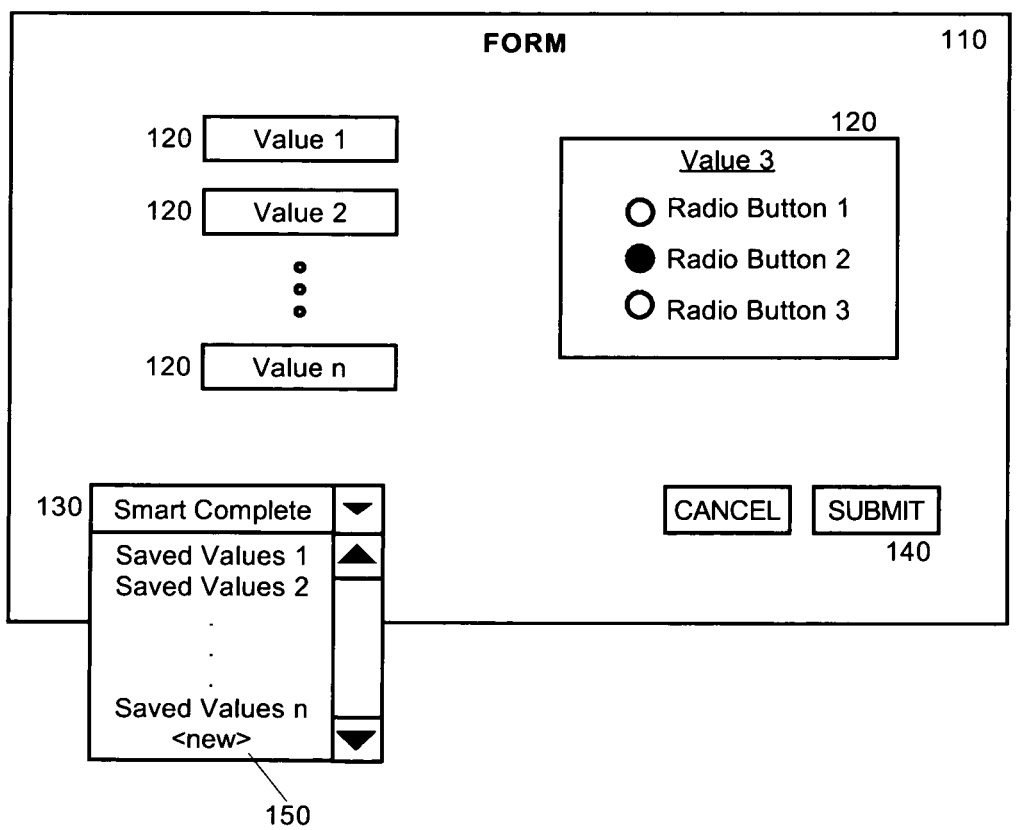
FIG. 1 is a pictorial illustration of a form configured for smart completion of form values.

In further illustration, FIG. 1 is a pictorial illustration of a form configured for smart completion of form values. As shown in FIG. 1, a form 110 can be provided to include one or more fields 120 in which values can be specified. A submit control element 140 further can be provided such that the values for the fields 120 of the form 110 can be electronically transmitted in a message to a designated computing process. To that end, the form 110 can be a markup language specified construct as is well known in the art and can contain different types of fields such as a text field, a text area, one or more radio buttons, one or more check boxes, and the like.

Notably, in the present invention, a smart complete control element 130 yet further can be included in the form 110 such that one or more previously saved sets of field values can be provided for selection. Specifically, a user can save the current fields and their values as a new form value set by selecting the new control element 150 from within the smart complete control 130. The new control element 150, when activated, can solicit from the user a name with which a user can distinguish the new form value set from other form value sets, and can trigger the execution of logic for capturing the values of the fields 120 and storing the values as a set of field values for the form 110. Subsequently, when selected in the smart complete control 130, a saved set of field values can be applied to the fields 120 of the form 110 without requiring the manual specification of a value for each of the fields 120 in the form 110.

Figure 2:
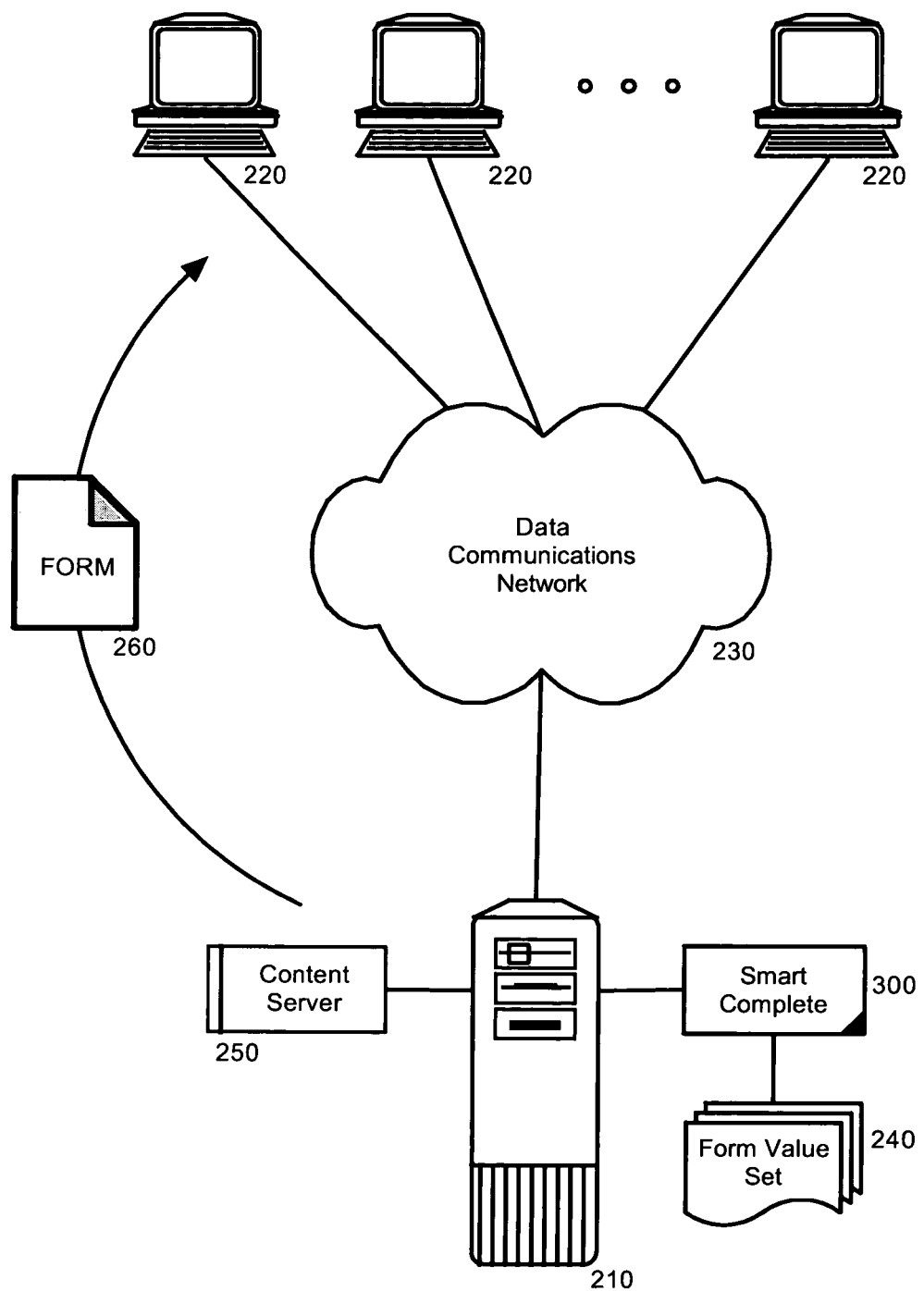
FIG. 2 is a schematic illustration of a content distribution system configured to distribute forms enabled for smart completion of form values in a form; and, FIG. 3 is a flow chart illustrating a process for smart completing form values in a form.

In more particular illustration, FIG. 2 is a schematic illustration of a content distribution system configured to distribute forms enabled for smart completion of form values in a form. The system can include a content distribution platform 210 communicatively coupled to one or more content consumption clients 220 over a data communications network 230. The content distribution platform 210 can include a content server 250 configured to serve requested markup to requesting content browsers disposed within the content consumption clients 220. In this regard, in an embodiment of the invention, the content server 250 can be a Web server configured for serving Web pages to requesting Web browsers. Alternatively, content distribution platform 210, content consumption clients 220 and content server 250 can be contained within a single system in support of application user interface incorporating forms of this nature.

Importantly, smart completion logic 300 can be coupled to the content server 250. The smart completion logic 300 can include program code enabled to define a form 260 within markup. The form 260 can include a save control element configured to save form field values for a form 260 as a form value set 240. The form 260 further can include a smart complete control element configured to present a listing of stored form value sets 240 which can be selectively applied to the fields of the form 260. The presentation of the listing of stored form value sets 240 can include stored form value sets which have been defined by a user requesting the form 260, or by other users.

Figure 3:
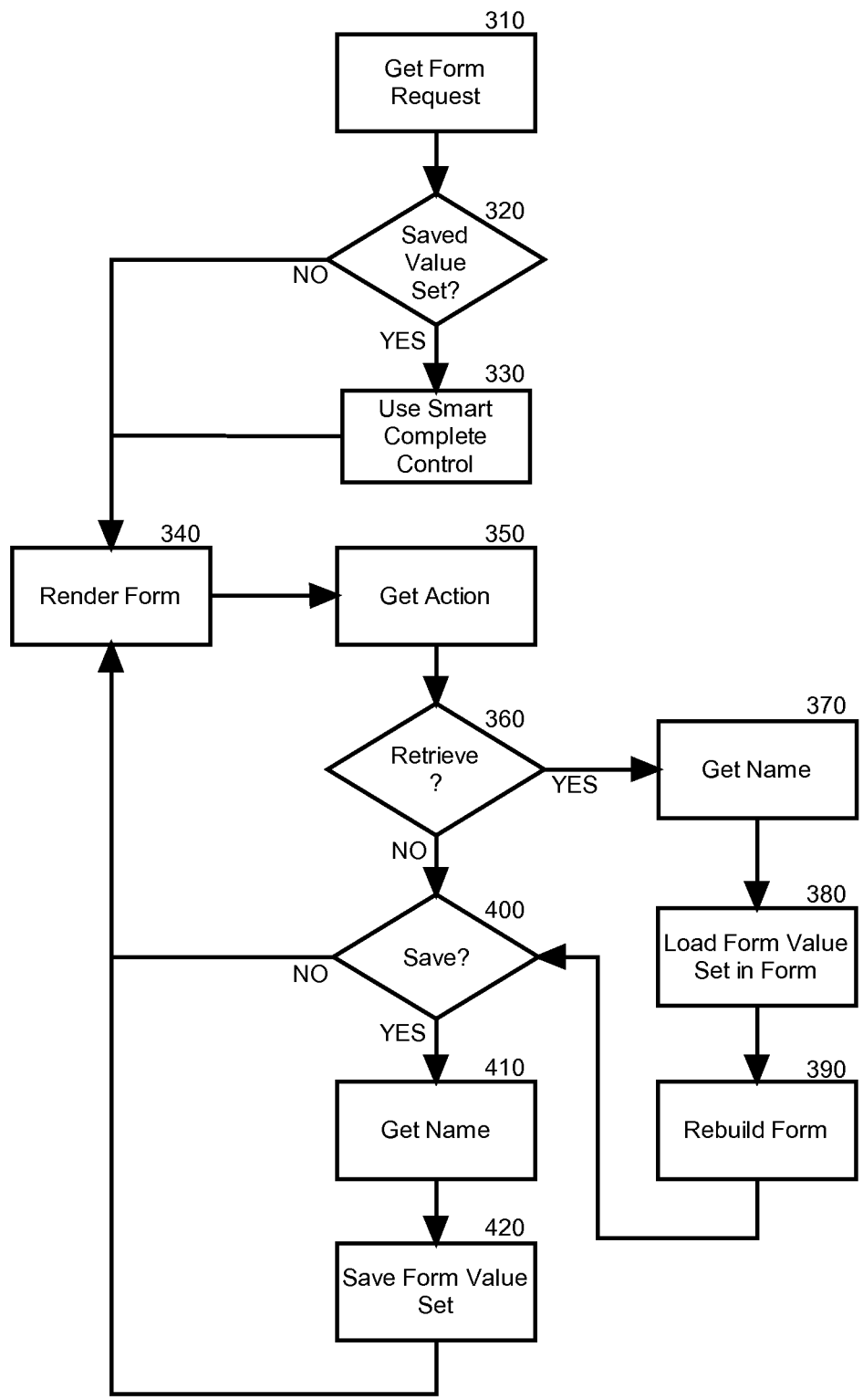

Referring now to FIG. 3, a flow chart is shown which illustrates a process for persisting form values in a form value set. Beginning block 310, a user initiates an operation that results in a request for a form to be presented to them to input data. In decision block 320, it can be determined whether or not a form has any form value sets already available. If so, in block 330, a smart complete control can be placed within the form which can provide the ability for a user to select an existing form value set by name. In block 340, the resultant form can be rendered in a client browser through which an interacting user can provide values for the fields in the rendered form.

In block 350, a user can initiate an action on the form to complete the form, or to save or retrieve a value set. In decision block 360, if the user has requested that a value set be retrieved, in block 370 the name of the value set can be determined from the request and in block 380 the entire value set can be loaded and applied against the form. Subsequently, in block 390 the form can be rebuilt. In decision block 400, if the user has requested that a value set be saved, in block 410 the name of the value set can be determined from the request and in block 420, the entire value set can be saved. Thereafter, the form can be displayed to the user, as illustrated in block 340.

Notably, in one aspect of the embodiment of the invention, the information persisted for a value set can include a name for the value set. Moreover, the information can include the name of the user if the form is presented from within a multi-user application. Yet further, a privacy flag can be included with the information which indicates whether the form value set is private to the originating user. Finally, for each field contained in the form value set, a field name and value can be persisted. In this way, when a form value set is retrieved, values can be applied against the form based on the name of the persisted fields. Subsequently, in block 390 the form can be rebuilt and displayed to the user in block 340. Finally, if neither a save or get value set operation is determined, the form can be determined to have been completed and the form can be displayed to the user in block 340.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A data processing system for completing form data comprising
   a processor configured to
      present a form to a user upon receiving a request by the user to present the form, the form comprising one or more fields and at least one of the one or more fields configured to accept user input;

determine whether there are existing form value sets defined by any user from a group of users including the requesting user and other users, available for the form;

in response to a determination that there are existing form value sets available for the form, present a list of the available form value sets for the form to the user;

receive a selection by the user of a form value set from amongst said available form value sets in said list;

apply form field values in said selected form value set to corresponding fields in the form;

in response to a determination that there is not any existing form value set available for the form, prompt the user to provide a value for each field in the form;

determine whether the user requested each value for each field in the form be saved in a new form value set upon the user providing the value for each field in the form; and, save the new form value set to be shared with other users comprising persisting a name for the new form value set, a name of the user, a field name for each field in the form, and also a corresponding value for each field upon determining that the user requested each value for each field in the form be saved in the new form value set.

2. The data processing system of claim 1, wherein said data processing system is a Web server and wherein said form is disposed in a Web page.

3. The data processing system of claim 1, wherein saving the new form value set further comprises persisting a privacy flag indicating whether the new form value set is private to the user.

4. A computer implemented method for completing form fields defined in a form, the method comprising:

presenting, by a processor of a computer, a form to a user upon receiving a request by the user to present the form, the form comprising one or more fields and at least one of the one or more fields configured to accept user input;

determining, by the processor of the computer, whether there are existing form value sets defined by any user from a group of users including the requesting user and other users, available for the form;

in response to a determination that there are existing form value sets available for the form, presenting, by the processor of the computer, a list of the available form value sets for the form to the user;

receiving, by the processor of the computer, a selection by the user of a form value set from amongst said available form value sets in said list;

applying, by the processor of the computer, form field values in said selected form value set to corresponding fields in the form;

in response to a determination that there is not any existing form value set available for the form, prompting, by the processor of the computer, the user to provide a value for each field in the form;

determining whether the user requested each value for each field in the form be saved in a new form value set upon the user providing the value for each field in the form; and, saving, by the processor of the computer, the new form value set to be shared with other users comprising persisting a name for the new form value set, a name of the user, a field name for each field in the form, and also a corresponding value for each field upon determining that the user requested each value for each field in the form be saved in the new form value set.

5. The method of claim 4, further comprising submitting the form over a data communications network.

6. The method of claim 4, wherein saving, by the processor of the computer, the new form value set further comprises persisting a privacy flag indicating whether the new form value set is private to the user.

7. A computer program product comprising a non-transitory computer-readable medium having stored thereon computer usable program code, which when executed by a computer, causes the computer to perform the followings steps:

presenting a form to a user upon receiving a request by the user to present the form, the form comprising one or more fields and at least one of the one or more fields configured to accept user input;

determining whether there are existing form value sets defined by any user from a group of users including the requesting user and other users, available for the form;

in response to a determination that there are existing form value sets available for the form, presenting a list of the available form value sets for the form to the user;

receiving, by the processor of the computer, a selection by the user of a form value set from amongst said available form value sets in said list;

applying form field values in said selected form value set to corresponding fields in the form;

in response to a determination that there is not any existing form value set available for the form, prompting the user to provide a value for each field in the form;

determining whether the user requested each value for each field in the form be saved in a new form value set upon the user providing the value for each field in the form; and, saving the new form value set to be shared with other users comprising persisting a name for the new form value set, a name of the user, a field name for each field in the form, and also a corresponding value for each field upon determining that the user requested each value for each field in the form be saved in the new form value set.

8. The computer program product of claim 7, further comprising submitting the form over a data communications network.

9. The computer program product of claim 7, wherein saving the new form value set further comprises persisting a privacy flag indicating whether the new form value set is private to the user.

* * * * *